United States Patent [19]

Maschlanka et al.

[11] Patent Number: 4,896,810
[45] Date of Patent: Jan. 30, 1990

[54] APPARATUS FOR MELTING SCRAP

[75] Inventors: Walter Maschlanka, Gaggenau; Markus Hubig, Aachen, both of Fed. Rep. of Germany

[73] Assignee: Deutsche Voest-Alpine Industrieanlagenbau GmbH, Duesseldorf, Fed. Rep. of Germany

[21] Appl. No.: 282,440

[22] Filed: Dec. 14, 1987

[30] Foreign Application Priority Data

Dec. 14, 1987 [DE] Fed. Rep. of Germany ....... 3742349

[51] Int. Cl.$^4$ ................................................. F27B 1/24
[52] U.S. Cl. ..................................... 266/200; 75/445; 266/900
[58] Field of Search .................... 266/200, 900; 75/445

[56] References Cited

U.S. PATENT DOCUMENTS

| | | | |
|---|---|---|---|
| 2,382,534 | 11/1944 | Baily | 75/445 |
| 3,753,688 | 8/1973 | Cherny et al. | 75/43 |
| 3,948,642 | 4/1976 | Gross | 75/445 |
| 4,758,270 | 7/1988 | Bardenheuer | 75/43 |

FOREIGN PATENT DOCUMENTS 2843678 7/1980 Fed. Rep. of Germany .

Primary Examiner—Melvyn J. Andrews
Attorney, Agent, or Firm—Barnes & Thornburg

[57] ABSTRACT

A process for melting metal scrap, particularly steel scrap or such high-melting charge material in a shaft furnace operated in cokeless manner by means of fluid fuels is described. The furnace shaft used for carrying out the process is separated from the furnace hearth connected to the bottom thereof by means of a cooled grate arrangement. The burners issue substantially vertically to the longitudinal axis of the shaft into the furnace and the combustion air is recuperatively preheated by means of the shaft furnace waste gases. The amount of heat introduced into the melting unit by means of the burners is subdivided in dosable manner into a component drawn off from the furnace shaft and a component remaining in the furnace hearth. For this purpose the radiating surface of the wall lining in the furnace hearth is between 1.5 and 3.5 m$^2$, particularly 2 and 2.8 m$^2$ ton of molten metal produced. The radiation-active, average layer thickness of the gas in the furnace hearth is between 1.5 and 3.5 m, particularly 2 and 2.5 m and the inlet temperature of the waste gas into the recuperator is controlled as a function of the charge material bed height in the furnace shaft.

11 Claims, 2 Drawing Sheets

APPARATUS FOR MELTING SCRAP

BACKGROUND OF THE INVENTION

1. Field of the Invention

The invention relates to a process for melting metal scrap particularly that which melts at high temperature such as steel. The invention relates particularly to a process for operating a shaft furnace to melt such scrap with fluid fuels and without the use of coke. The shaft furnace apparatus includes a furnace shaft separated from a furnace hearth located below the shaft by a cooled grate arrangement, and burners issueing into the furnace substantially at right angles to the longitudinal axis of the shaft. In the process of operating such a furnace, the combustion heat is recuperatively preheated by means of the shaft furnace waste gasses.

2. Description of the Prior Art

Processes are known for melting iron for pig iron production using cupola furnaces operated in cokeless manner. Thus, e.g. German Patent No. 22 04 042 describes a process for melting iron in a vertical shaft furnace without using coke and using a fluid fuel/air mixture which is burnt outside the furnace in burners which are positioned close to the lower part of the furnace. Iron scrap and cast iron is charged into the upper end of the furnace and melted, the superheated material dripping through a bed of loose refractory materials arranged within the shaft. The refractory materials are heated by the combustion products of the burners, before the upwardly travelling combustion products melt the metal moving towards them. Molten metal can be tapped from the bottom of the furnace.

The combustion products are introduced from all sides into the free area of the furnace from several burners, which are entirely located below the refractory material bed. The temperature of the gases in the vicinity of the bed are kept at a maximum of about 1600° C. The actual furnace hearth is formed by a lower cylindrical extension of the cylindrical furnace shaft with the same diameter. Shaft and hearth are separated from one another by a water-cooled grate with the bed material arranged thereon. At the bottom of the furnace, the molten metal which has dripped through the grate collects and can be tapped off there continuously or intermittently by means of a tap hole. A similar arrangement can be used to remove the slag floating on the molten metal.

In a Hayes or Taft furnace the arrangement is such that the combustion gases from the combustion chambers meet in a central lower zone of the shaft in the so-called hearth area below the grate and, flowing upwards from there, heat the refractory bed and then, in counterflow, heat the charged material.

A further development of a cokeless cupola furnace is formed by the known Duker furnace, which includes a cylindrical shaft arrangement. A lower part of the shaft having constant cross-section is located below the water-cooled grate and forms the furnace hearth, into which oil burners issue roughly radially through the furnace wall. The molten pig iron collecting in the bottom region can be tapped off by means of a skimmer arrangement and supplied to a super heater.

A fuel oil or gas-heated shaft furnace for melting and superheating metal, specifically cast iron and copper is described in German Patent No. 38 43 678 which operates with a per charge addition of coke. The furnace has several outer burner chambers which are connected via water-cooled nozzles to the furnace interior, the burner chambers and the nozzles being located in the through-drip zone formed by the coke. Theoretically, no slag protection is required for the dripping iron in this furnace, because the protection is ensured by the reducing combustion of fuel oil and natural gas.

In connection with scrap melt-down processes, reference is also made to the shaft furnace described in German Patent No. 23 27 073, whose meltdown vessel increases in cross-section to a limited, continuous extent in the downwards direction and in which the radial burner systems are located in the immediate bottom area of the melt-down vessel where the liquid phase collects. The molten pig iron is continuously tapped off by means of a drain in the bottom. A less-than adequate separation between the solid charge material, such as e.g. iron scrap or the like, and the liquid phase is achieved due to the total omission of a separating grate arrangement in the central base of the bottom area. The presence of such a grate would insure the heat transfer between the molten material and the charge material column is reduced, or is at least kept as small as possible.

The aforementioned, cokeless-operated foundry shaft furnaces have the common feature that the furnace shaft and furnace hearth generally form a single, substantially cross-sectionally cylindrical component, i.e. a simple tube shaft. The lower portion of the tube shaft constitutes the furnace hearth with minimized surfaces for the furnace wall.

However, the known arrangement of the Flaven furnace melting unit comprises two constructional units which differ even as regards the external construction. Namely, a vertical, cross-sectionally cylindrical furnace shaft is joined to one end of a furnace hearth which is horizontal with respect thereto by means of a water-cooled grate. At the other end of the furnace hearth, a burner is situated whose flame is directed onto the tap area of the liquid phase and whose flame gases flow horizontally over the liquid bath and in guided manner to the grate arrangement and rise again from there in counterflow within the furnace shaft. The tunnel-like hearth area gives the iron bath a relatively large surface, over which the hot fuel gas can pass, without the main part of the refractory material of the hearth furnace being subject to the direct action of the burner flame. Thus, in the case of this known arrangement, the proportion of heat supplied by thermal irradiation from the hearth wall is at a minimum.

Finally, a process for melting metal in a shaft furnace using a liquid or gaseous fuel with a grate located at the lower end of the furnace for supporting the not yet molten metal introduced in the furnace is disclosed in DE-OS No. 36 10 498, U.S. Pat. No. 4,758,270, in which the oxygen-containing gas required for burning the fuel is heated prior to combustion and in which a tunnel-like furnace hearth issues horizontally into the lower part of a vertical furnace shaft. The burners are located in the end face opposite to the furnace shaft opening, so that the flame is directed in the longitudinal direction of the furnace hearth onto the inlet port in the furnace shaft, so that the flame supplies heat to the entire inner area. Consequently, the heat in the hearth walls, or the refractory material thereof, can then irradiate in the form of radiant heat onto the molten iron surface.

The known shaft melting furnaces of the described type are only suitable for pig iron production in foundries, because the relatively low temperatures attainable in the furnace hearth lead to an excessive carbon proportion in the liquid phase for steel production. Thus, foundry furnaces are only operated with a maximum of less than 40% steel scrap with respect to the charge material.

The problem of the present invention is to provide a process and an apparatus of the aforementioned type making it not only possible to use random scrap components as the charge material, but e.g. also 100% steel scrap. Simultaneously, as a function of the desired further processing, it is a problem to add molten steel in the furnace hearth while also simplifying and improving the construction of the apparatus for performing the process.

SUMMARY OF THE INVENTION

From the process standpoint this problem is inventively solved by controlling the amount of heat introduced into the melting unit by means of the burners such that the heat is subdivided into a first component remaining in the furnace hearth and a second component drawn off to the furnace shaft, the components being controlled by providing that: (a) the bevelled heat radiating surface of the refractory wall lining in the furnace hearth is between 1.8 and 3.5 $m^2$/ton of molten metal produced, (b) the average radiation-active, layer thickness of the gas in the furnace hearth is between 1.5 and 3.5 m., and (c) the temperature at which the waste gas enters the recuperator is controlled as a function of the height of the charge material bed in the furnace shaft, said height being dependent on the scrap type used. The average radiation-active layer thickness is to be understood to mean the average distance of the bevelled heat-radiating wall of refractory material in the furnace area from the molten metal surface.

In preferred arrangements of the invention, the radiating surface is between 2 and 2.8 $m^2$/ton and the average layer thickness of the gas is between 2 and 2.5 m. The height of the bed is preferably set in such a way that the entry temperature into the recuperator is adjusted so as to minimize the oxidizing on of the charge material in the furnace shaft. In conjunction with a minimization of the bed height, the air inlet temperature for the burners into the furnace hearth is preferably set between 800° and 900° C. Preferably 80 to 90% of the heat transfer to the bath of the molten phase takes place by radiation, and 10 to 20% takes place by convection. Based on the hearth area, the radiation percentage is formed from approximately 25% gas radiation and 50 to 80%, preferably 75%, wall radiation. Preferably, the temperature in the furnace shaft is adjusted at least to the level of the vaporization temperature of zinc. Any zinc component present in the shaft is then vaporized and is completely oxidized in the secondary combustion chamber, so that it can be subsequently separated from the dust phase obtained.

From the apparatus standpoint, the problem is in particular inventively solved by providing a vertical furnace shaft and a furnace hearth separated from one another by a cooled grate. The furnace hearth is directly connected to the cooled grate arrangement of the furnace shaft and widens downwards initially concentrically in cross-section with a parabolic or bevelled radiating surface. Subsequently, at least in the burning area, the furnace hearth passes into a vertical, cylindrical portion of correspondingly increased diameter.

Preferably, the angular inclination of the radiating surfaces of the furnace hearth is selected in such a way that the irradiation is directed roughly toward the central region of the liquid phase on the hearth bottom. The flame cross-sections of the burner or burners are minimized at right angles to the radiating surface and the furnace walls. In a preferred embodiment the burner or burners are arranged tangentially horizontally, and preferably are inclined by up to a maximum of 10% against the roof portion of the radiating surface.

Preferably, the furnace shaft is a cylindrical shaft, whose circular cross-section passes via the parabolically widening upper portion in the furnace hearth and towards the lower portion of the furnace hearth continuously into the enlarged cross-section portion. Behind the furnace shaft is arranged a secondary combustion chamber for burning impurities present in the oxidizing atmosphere.

It has been observed that optimum conditions exist regarding the superheating possibility of the liquid phase by the radiating surfaces of the refractory lining in the hearth furnace, measured against the melting capacity in tons of charge material per hour, and can be precisely defined relative thereto. By contrast, the known, prior art cupola furnaces essentially have no radiant energy in the inventive sense for the heating of the liquid phase, because the hearth walls therein are kept to a minimum, independently of whether there is cokeless operation or coke is used, Thus, such prior art shaft furnaces are only suitable for cast iron production and the processing of steel is impossible due to the low temperatures present. Steel melting furnaces are generally operated with a maximum charge material proportion of 40% steel scrap. It has been generally accepted in the art that higher steel proportions would appear to be impossible for processing.

However, excessively large radiating surfaces of the walls in the hearth area lead to high energy losses via the refractory material of the wall, so that an inadequate energy component passes into the furnace shaft and the temperature attainable there is no longer sufficient to melt the scrap present.

Not only is the total installed capacity important, but the subdivision of the energy over the bath and shaft is of decisive importance, so that on the one hand there is sufficient energy in the shaft for melting the scrap and on the other hand the hearth area is dimensioned in such a way that the molten metal can be superheated to adequately high temperatures. For this purpose a particularly advantageous dependence is Produced between the inlet temperature into the recuperator, while minimizing the risk of oxidizing on the charge material in the furnace shaft, as a function of the bed height of said material.

The transition between the furnace shaft and the furnace hearth is, unlike in the prior art, not of the type revealing no cross-sectional change, nor of the type in which shaft and hearth are vertically joined together as separate elements. The concentric arrangement of the furnace hearth with a large diameter with respect to the furnace shaft with a small diameter is in such a way that the transition takes place via sloping surfaces defining parabolic radiating surfaces. This also simplifies the refractory lining and improves the dripping behaviour of the molten metal in the melting unit in a particularly advantageous manner. The problems occurring when lining with the refractory material, e.g. in the Flaven furnace, as well as the poor dripping behaviour occurring below the water-cooled furnace grate, is obviated by the novel arrangement according to the invention.

A vertical, circular cross-section issues into another vertical, circular cross-section via an inclined wall portion located directly below the water-cooled grate and whose dimensioning once again corresponds to the smaller cross-section of the furnace shaft. The gas inflow conditions in the shaft over the grate are also advantageously influenced in this connection. The charge material and in particular the steel scrap bed height, unlike in the known teaching, no longer has to be maximized but, as is particularly important for the present charge material, can in fact be minimized, because the heat exchange effect via the bed column no longer has any primary influence on the process sequence. Instead, the air mixture for the burners is so preheated via heat exchangers that it is possible to operate with the indicated low charge heights above the grate. The waste gas inlet temperature into the recuperator is on the one hand controlled by the scrap bed height, and its characteristics are on the other hand controlled by the secondary combustion and cooling air addition. The major influence of the heat distribution of the burners on the shaft and on the lower furnace, in the case of an appropriate division of said two components, is fully determined by the present procedure, while bearing is mind the novel constructional features.

As a result of the high temperatures reached, it is possible to vaporize in the shaft any undesirable metal components present in the charge material as impurities, such as zinc, and such fractions can be completely oxidized in a secondary combustion chamber. Such fractions can subsequently become constituents of the dust ash which can be kept in separators and then discharged. Depending upon the enrichment of such contaminations with certain coarse and/or fine dust characteristics, discharge can take place in fractionally filtered or other forms.

In order to be able to set the desired carbon content in the metal bath and simultaneously suppress slag formation of the charge material on the bath surface, carbon carriers can be blown into the metal bath, using both underbath nozzles and lances insertable above or below the bath surface. Thus, it is easily possible to produce from the charge material both steel and cast iron.

Additional features and advantages of the invention will become apparent to those skilled in the art upon consideration of the following detailed description of a preferred embodiment exemplifying the best mode of carrying out the invention as presently perceived. The detailed description particularly refers to the accompanying FIGS. 1 and 2.

DESCRIPTION OF THE ILLUSTRATED PREFERRED EMBODIMENT

Figure 1:
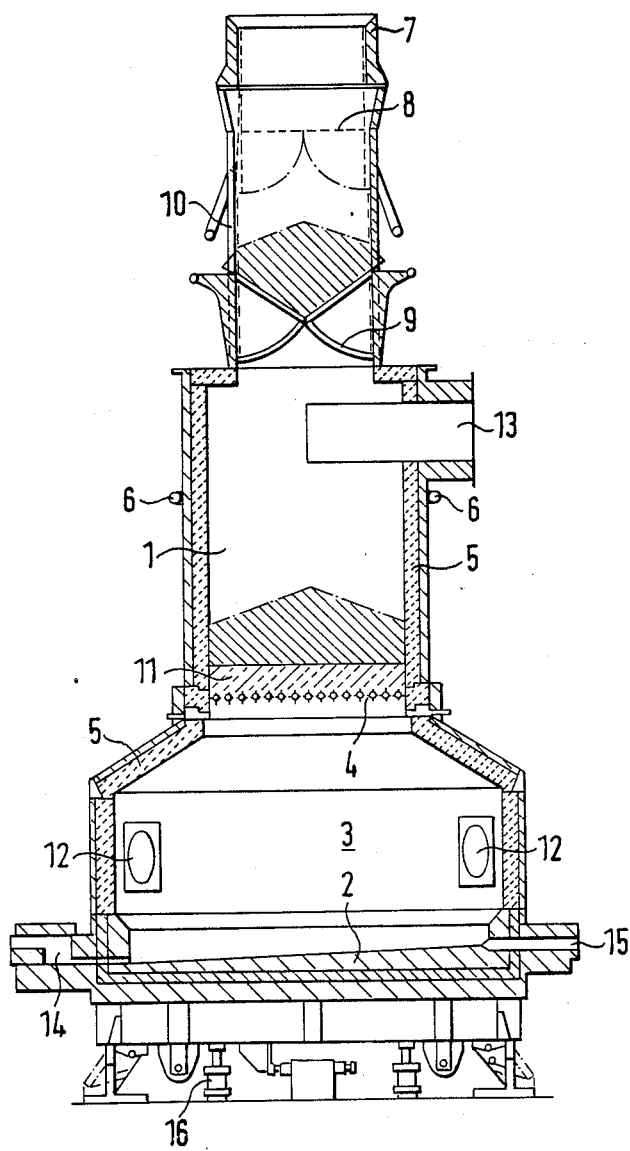
FIG. 1 is a cross section view of a furnace according to the present invention.

As shown in FIG. 1 in longitudinal section, a scrap melting furnace according to the present invention essentially comprises a furnace shaft 1, a furnace hearth 2, a hearth area 3 and an intermediate water-cooled grate 4. Both shaft 1 and hearth 2 or hearth area 3 are lined with refractory material 5. In the case of premature wear, the furnace hearth can be lowered by means of a hydraulic device 16 and replaced by a relined hearth.

There can also be an external cooling by spray water via a ring main 6. The furnace shaft is charged with scrap by means of a bucket 7, which can be opened by means of a bottom flap 8. For gas tight closure of the furnace, the furnace shaft 1 is provided with a hinged cover 9 on which the scrap is initially held back. When the full bucket 7 has been placed on the filling shaft 10, cover 9 is opened and the scrap drops onto the packed ceramic bed 11 located above grate 4.

Burners 12 produce, in the hearth area 3, hot combustion gases, whose temperature is well above the melting point of the scrap. These gases flow through the grate 4 and the packed ceramic bed 11 to melt the scrap. The gas then flows through the scrap bed and leaves the furnace via the waste gas line 13. Molten metal formed from the melting scrap drips through the packed ceramic bed, where superheating takes place before the drips drop onto the hearth 2. The molten metal collecting on the hearth is superheated by the gas radiation in the hearth area 3, by the radiation of the hearth area walls, and to a limited extent, by convection. The molten metal is removed through the tap holes 14 and the molten slag via the opening 15 from the furnace.

Figure 2:
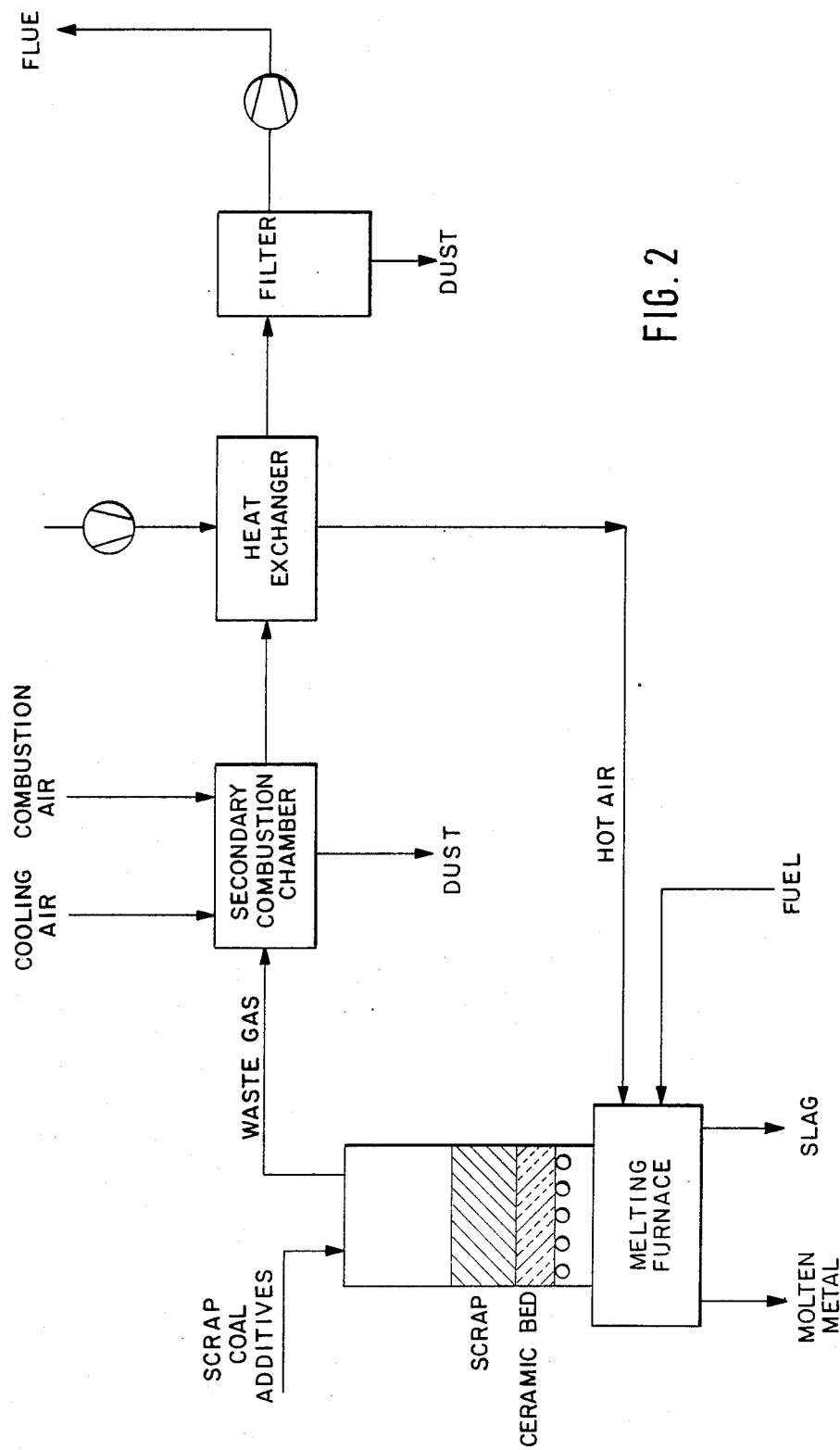
FIG. 2 is a process diagram relating the process of operating the furnace shown in FIG. 1.

The hot waste gas is after-burned in a secondary combustion chamber 21 schematically shown in FIG. 2 and mixed with cooling air at the appropriate temperature. At the recuperator 22, combustion air is preheated with the heat of the waste gas. The dust produced is subsequently discharged in a filter 23.

Although the invention has been described in detail with reference to the illustrated embodiment, variations and modifications exist within the scope and spirit of the invention as described and as defined in the following claims.

We claim:

1. A furnace for melting metal scrap comprising: a shaft-like upper portion having a vertical longitudinal axis for containing metal scrap to be melted, a cooled grate at a lower end of the upper portion for retaining the metal scrap in the upper portion until melted, and a lower portion joined coaxially to the upper portion below the cooled grate, the lower portion comprising:
    (a) a radially outwardly and downwardly inclined portion having a lower end, and having an upper end joined to the lower end of the upper portion, the inclined portion defining a radiating surface,
    (b) a vertically walled portion having an upper end joined to the lower end of the inclined portion, substantially vertical walls defining the perimeter of the vertically walled portion, and a lower end closed by a bottom to define a hearth for containing a volume of molten metal, the volume having an upper surface, and
    (c) burner means situated in the vertically walled portion for issuing heat into the furnace substantially at right angles to the longitudinal axis and above the upper surface of the volume, the upper surface being situated at an average of between 1.5 and 3.5 meters below said radiating surface, the area of the radiating surface being between about 1.8 and 3.5 m$^2$/ton of molten metal.

2. The furnace of claim 1 wherein the area of the radiating surface is between about 2.0 and 2.8 m$^2$/ton of molten metal.

3. The furnace of claim 1 wherein the upper surface of the volume is situated at an average of between about 2.0 and 2.5 meters below said radiating surface.

4. The furnace of claim 1 wherein the radiating surface is in the form of a parabola focused at a central region of the volume.

5. The furnace of claim 1 further comprising a ceramic bed situated on the cooled grate, the ceramic bed being sufficiently porous to permit gases to flow upwardly and scrap melt to drip downwardly therethrough.

6. A furnace for melting metal scrap comprising: a shaft-like upper portion having a vertical longitudinal axis for containing metal scrap to be melted, a cooled grate at a lower end of the upper portion for retaining the metal scrap in the upper portion until melted, and a lower portion joined coaxially to the upper portion below the cooled grate, the lower portion comprising:
 (a) a vertically walled portion situated in spaced relation below the upper portion including substantially vertical walls defining the perimeter of the vertically walled portion, and a lower end closed by a bottom to define a hearth for containing a volume of molten metal, the volume having an upper surface, and
 (b) a radially outwardly and downwardly inclined portion having a lower end joined to the upper end of the vertically wall portion, and having an upper end joined to the lower end of the upper portion, the inclined portion defining a radiating surface, the radiating surface being in the form of a parabola focused at a central region of the volume.

7. The furnace of claim 6 further comprising burner means in the vertically walled portion for issuing heat into the furnace substantially at right angles to the longitudinal axis and above the upper surface of the volume.

8. The furnace of claim 6 wherein the upper surface of the volume is situated at an average of between about 1.5 and 3.5 meters below said radiating surface.

9. The furnace of claim 8 wherein the upper surface of the volume is situated at an average of between about 2.0 and 2.5 meters below said radiating surface.

10. The furnace of claim 6 wherein the area of the radiating surface is between about 1.8 and 3.5 $m^2$/ton of molten metal.

11. The furnace of claim 10 wherein the area of the radiating surface is between about 2.0 and 2.8 $m^2$/ton of molten metal.

* * * * *

UNITED STATES PATENT AND TRADEMARK OFFICE
CERTIFICATE OF CORRECTION

PATENT NO. : 4,896,810

DATED : January 30, 1990

INVENTOR(S) : Maschlanka et al.

It is certified that error appears in the above-identified patent and that said Letters Patent is hereby corrected as shown below:

On the title page item "[22] Filed: Dec. 14, 1987" with --[22] Filed: Dec. 9, 1988--.

Signed and Sealed this

Twenty-sixth Day of February, 1991

Attest:

HARRY F. MANBECK, JR.

*Attesting Officer*      Commissioner of Patents and Trademarks